United States Patent
Ashikhmin et al.

(10) Patent No.: US 8,995,401 B2
(45) Date of Patent: Mar. 31, 2015

(54) MULTIPLE ANTENNA METHOD AND APPARATUS FOR REDUCING INTER-CELL INTERFERENCE IN MULTI-USER WIRELESS SYSTEMS

(75) Inventors: Alexei Ashikhmin, Morristown, NJ (US); Thomas Louis Marzetta, Summit, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 474 days.

(21) Appl. No.: 12/851,728

(22) Filed: Aug. 6, 2010

(65) Prior Publication Data

US 2011/0280162 A1 Nov. 17, 2011

Related U.S. Application Data

(60) Provisional application No. 61/334,667, filed on May 14, 2010.

(51) Int. Cl.
*H04Q 9/00* (2006.01)
*H04B 7/06* (2006.01)
*H04B 7/08* (2006.01)

(52) U.S. Cl.
CPC ............ *H04B 7/0617* (2013.01); *H04B 7/0691* (2013.01); *H04B 7/0825* (2013.01)
USPC .......................................... 370/334; 455/501

(58) Field of Classification Search
CPC .................................................... H04B 1/1027
USPC .......................................... 370/334; 455/501
See application file for complete search history.

(56) References Cited

U.S. PATENT DOCUMENTS

| | | | |
|---|---|---|---|
| 7,336,745 B2 * | 2/2008 | Casabona et al. | 375/346 |
| 2005/0002468 A1 * | 1/2005 | Walton et al. | 375/267 |
| 2005/0003863 A1 | 1/2005 | Gorokhov | |
| 2009/0227263 A1 * | 9/2009 | Agrawal et al. | 455/452.1 |
| 2010/0034146 A1 | 2/2010 | Hou et al. | |
| 2010/0322339 A1 * | 12/2010 | Fety et al. | 375/285 |
| 2011/0263281 A1 * | 10/2011 | Cai et al. | 455/501 |

FOREIGN PATENT DOCUMENTS

| | | |
|---|---|---|
| CN | 1411299 A | 4/2003 |
| CN | 1582541 A | 2/2005 |

(Continued)

OTHER PUBLICATIONS

T.L. Marzetta, "How much training is required for multiuser MIMO," proc. of Signal. Systems. and Computers, ACSS 2006, Fortieth Asilomar Conference, pp. 359-363 (Nov. 2006)—5 pages.
Office Action for corresponding Japanese Application No. 2013-511183 dated Dec. 12, 2013 and English translation thereof.

(Continued)

*Primary Examiner* — Wanda Z Russell
(74) *Attorney, Agent, or Firm* — Harness, Dickey & Pierce

(57) ABSTRACT

A method is provided to reduce inter-cell interference in mobile wireless systems, and particularly in TDD wireless systems. In an embodiment, a base station receives a pilot signal from at least one of the mobile terminals that it serves at a plurality of base station antennas, which include both main antennas and auxiliary antennas. In response, each of the base station antennas provides an output that is processed to obtain a set of precoding weights for a transmission from the main antennas. The processing includes nulling at least one interfering signal using the outputs from at least the auxiliary antennas.

7 Claims, 5 Drawing Sheets

(56) References Cited

FOREIGN PATENT DOCUMENTS

| CN | 101447817 | 6/2009 |
|---|---|---|
| GA | 2 306 057 A | 4/1997 |
| JP | 2006226897 A | 8/2006 |
| JP | 2009290763 A | 12/2009 |
| WO | WO-2010017482 A1 | 2/2010 |
| WO | PCT/US2011/034887 | 5/2011 |

OTHER PUBLICATIONS

Office Action for corresponding Korean Application No. 10-2012-7032481 dated Feb. 26, 2014 and English translation thereof.

Office Action for corresponding Chinese Application No. 201180023984.X dated Aug. 25, 2014.

Office Action for corresponding Chinese Application No. 201180023984.X dated Aug. 25, 2014 and English translation thereof.

* cited by examiner

MULTIPLE ANTENNA METHOD AND APPARATUS FOR REDUCING INTER-CELL INTERFERENCE IN MULTI-USER WIRELESS SYSTEMS

CROSS-REFERENCE TO RELATED APPLICATIONS

This non-provisional application claims the benefit of priority under 35 U.S.C. §119(e) to U.S. Provisional Application No. 61/334,667, filed on May 14, 2010, the entire contents of which is incorporated herein by reference.

FIELD OF THE INVENTION

The invention relates generally to wireless communication networks in which user terminals transmit pilot signals to a base station for the purpose of measuring propagation characteristics. The invention relates more particularly to mobile wireless systems employing Time-Division Duplexing (TDD).

ART BACKGROUND

In a typical mobile wireless multi-user system, a plurality of radio cells cover an extensive geographical area. A base station (BS) is centrally located within each cell. The BS receives and transmits data to those mobile user terminals, referred to hereinafter as "mobiles" or "mobile stations", that are located in the same cell as the BS.

However, signals transmitted by a given base station will propagate not only to the mobiles within its own cell, but also to mobiles in the neighboring cells. As a consequence, downlink transmissions from each base station will tend to create noise, referred to as "intercell interference," at the mobiles of neighboring cells. Similarly, signals transmitted by each mobile within a given cell will propagate not only to the base station serving that cell, but also to the base stations serving neighboring cells. As a consequence, uplink transmissions from each mobile will tend to create intercell interference at the base stations serving neighboring cells.

For example, FIG. 1 illustrates a portion of a cellular network in which downlink transmissions from the base station of Cell 1 interfere with mobile stations in Cell 2.

Intercell interference, as described above, is a major obstacle to increasing the rate of data transmission in modern wireless systems. In particular, intercell interference degrades the gains in transmission rate that can otherwise be made by employing multiple antennas at the base station. That is, the theoretical maximum feasible transmission rate on the downlink increases linearly with the number of base station antennas. However, the amount of intercell interference increases with the number of base station antennas in such a way that only a sublinear increase is achieved.

SUMMARY OF THE INVENTION

We have found an efficient way to reduce inter-cell interference in mobile wireless systems, and particularly in Time Division Duplexing (TDD) wireless systems.

In an embodiment, a base station serving one or more mobile terminals receives a pilot signal from at least one of the served mobile terminals at a plurality of base station antennas, which include at least some main antennas and at least some auxiliary antennas. In response to the pilot signal as received at each of the antennas, an output is provided from each antenna of the antenna plurality. The antenna outputs are processed to obtain a set of precoding weights for a transmission from the main antennas. The processing includes nulling at least one interfering signal using the outputs from at least the auxiliary antennas.

DETAILED DESCRIPTION

Figure 1:
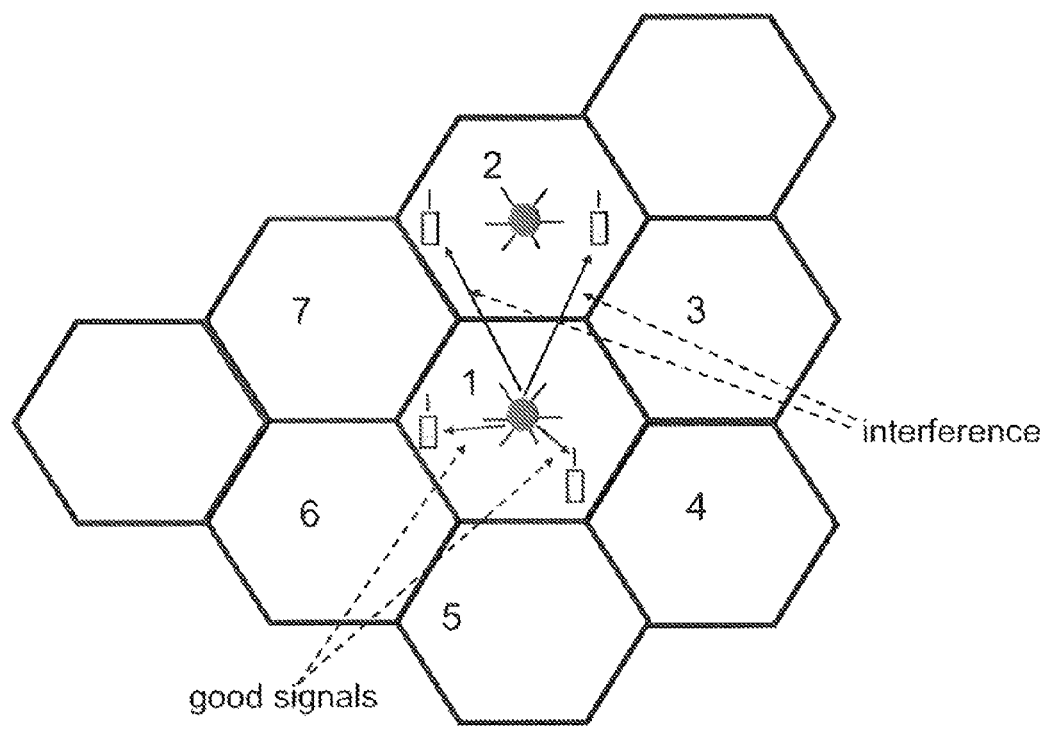
FIG. 1 is a schematic drawing of a portion of a typical cellular network having hexagonal geometry, illustrating inter-cell interference between the cells numbered 1 and 2 in the figure.

Channel Coefficients.

For purposes of illustration, we will base our description on a network in which OFDM data transmission is used. The invention is not limited in application to OFDM networks, however, but instead is applicable to any type of network in which uplink pilot signals are used for the purpose of measuring characteristics of the propagation channel.

For simplicity of presentation, we will limit the following discussion to one of the plurality of orthogonal subchannels used in OFDM systems for data transmission. Extension of the below discussion to the full set of OFDM subchannels is straightforward.

In the below discussion, signals and coefficients will be indexed using the following symbols:

j identifies a particular cell in which a mobile is present;

l identifies a particular base station and by extension, the cell served by that particular base station;

k identifies a particular mobile within a given cell; and m identifies a particular antenna at a given base station.

We will assume that there are L cells in a group consisting of a given cell and its neighboring cells, with K mobiles in each cell. We will assume that all base stations have M antennas for transmission and reception and that each mobile has one antenna. We denote signals transmitted by the k-th mobile of the j-th cell by $x_{jk}$. Signals received by the m-th antenna of the l-th base station we denote by $y_{lm}$. By $p_{MS}$ and $p_{BS}$ we denote transmitted power levels of mobiles and base stations respectively. For illustrative purposes, we will make the simplifying assumption that all mobiles have the same power and that all base stations have the same power.

During transmission, the effect of the propagation channel is to multiply each signal from the k-th mobile of the j-th cell to the m-th antenna of the l-th base station by the complex-valued channel coefficient $h_{jklm}$. The respective channel coefficients from the k-th mobile of the j-th cell to the M antennas of the l-th cell form the channel vector $$h_{jlk} = (h_{jlk1}, \ldots, h_{jlkM}).$$

(Herein, the bold font is used to denote vectors.) The channel coefficients $h_{jlkm}$ are modeled as random variables. The channel coefficients $h_{jlkm}$ remain approximately constant during the coherence interval T. The length of the coherence interval T depends on the speed of a mobile. The faster a mobile is moving, the shorter the coherence interval for its channel coefficients $h_{jlk}=(h_{jlk1}, \ldots, h_{jlkM})$. For mobiles moving with a speed of 50 or 70 km/h the coherence interval T is approximately equal to the time needed for transmission of or OFDM symbols, respectively.

Because in our example the same frequency subchannel is used on both the downlink and the uplink, reciprocity applies and a signal transmitted from the m-th antenna of the l-th base station base station to the mobile is likewise multiplied by the same channel coefficient $h_{jlkm}$.

Shadowing Coefficients.

Practical experience has shown that in modeling a wireless network, it is useful to include a relatively slowly varying, generally real-valued coefficient to represent attenuation of transmitted signals due to distance or other factors such as intervening topographical features, buildings, or other physical obstructions. That is, a signal transmitted from the k-th mobile of the j-th cell to any antenna of the l-th base station is multiplied by the shadowing coefficient $\beta_{jlk}$. The shadowing coefficients $\beta_{jlk}$ take random values. Unlike the channel coefficients, the shadowing coefficients stay constant much longer. For this reason a base station can, at least in principle, accurately estimate the shadowing coefficients to all the mobiles of the neighboring cells.

Accordingly, we will assume in the following discussion that the shadowing coefficients $\beta_{jlk}$, $j=1, \ldots, L$, $k=1, \ldots, K$, are known to the l-th base station. It is also important to note that the shadow coefficient $\beta_{jlk}$ will, in general, be strongly correlated with the distance between the l-th base station and the k-th mobile of the j-th cell. The larger the distance, the smaller (typically) will be the value of $\beta_{jlk}$.

Knowledge of the channel coefficients allows a base station to reduce the intra-cell interference and the inter-cell interference by using interference cancellation precoding.

To allow the base stations to estimate the channel coefficients $h_{jlkm}$, all mobiles, in all cells, synchronously (in the present example) transmit training pilot signals $\psi_{jk}$, $j=1, \ldots, L$, $k=1, \ldots K$, of $\tau$ symbols each. Thus, each pilot signal is a $\tau$-tuple of scalar-valued symbols, and as such is a $\tau$-dimensional vector. As a consequence of a pilot signal $\psi_{jk}$ having been transmitted, a $\tau$-dimensional vector $y_{lm}$ is received at the m-th antenna of the l-th cell, having the form $$y_{lm} = \sum_{j=1}^{L}\sum_{k=1}^{K} \sqrt{p_{MS}\tau\beta_{jlk}}\, h_{jlkm}\psi_{jk} + w_{lm} \quad (1)$$

where the $\tau$-tuple $w_{lm}$ represents additive noise.

We now introduce the following definitions, expressed in terms of quantities defined above:

$$Y_l = [y_{l1}, \ldots, y_{lM}],\ W_l = [w_{l1}, \ldots, w_{lM}],$$

$$\Psi_j = [\Psi_{j1}, \ldots, \Psi_{jK}],\ D_{jl} = \mathrm{diag}\{\beta_{jl1}, \ldots, \beta_{jlK}\},$$

$$H_{jl} = \begin{bmatrix} h_{jl11} & \cdots & h_{jl1M} \\ \vdots & \ddots & \vdots \\ h_{jlK1} & \cdots & h_{jlKM} \end{bmatrix} = \begin{bmatrix} h_{jl1} \\ \vdots \\ h_{jlK} \end{bmatrix}.$$

From Eqn. (1), the signal received at the l-th base station is $$Y_l = \sqrt{p_{MS}\tau}\sum_{j=1}^{L} \Psi_j D_{jl}^{1/2} H_{jl} + W_l \quad (Y_l \text{ is a } \tau \times M \text{ matrix})$$

It will be understood that $Y_l$ is a matrix, each of whose columns corresponds to one of the M antennas at the l-th base station. Each column of $Y_l$ is a $\tau$-tuple of scalar values. Each of the scalar values corresponds to one of the $\tau$ symbols of the transmitted pilot signal, and represents a sum, at the m-th antenna, of the various versions of the symbol as received from the respective mobiles occupying the served cell and neighboring cells, plus additive noise.

When the pilot signals $\psi_{jk}$ are designed to be mutually orthogonal (as is typically the case), their orthogonality properties can be used in an appropriately designed receiver to recover estimates of the individual channel coefficients $h_{jlk}=(h_{jlk1}, \ldots h_{jlkM})$ at the l-th base station. Even if there are small deviations from complete orthogonality, it may be possible to employ the same techniques to obtain estimates of the channel coefficients. Accordingly, it should be understood that when we speak herein of "orthogonal" pilot signals, we mean to include pilot signals that may deviate somewhat from complete orthogonality, but not so much as to render ineffective the estimation of individual channel coefficients.

Thus, for example, an MMSE estimator uses prior knowledge of the pilot signals and the orthogonality property that $\Psi_i^* \Psi_j = \delta_{ij} I_K$ to recover an estimate $\hat{H}_{jl}$ of the matrix $H_{jl}$ defined above. $I_K$ is the K×K unity matrix.

That is, the MMSE estimator of $H_{jl}$ given $Y_l$ is $$\hat{H}_{jl} = \begin{bmatrix} \hat{h}_{jl1} \\ \vdots \\ \hat{h}_{jlK} \end{bmatrix}$$

$$= \sqrt{p_{MS}\tau}\, D_{jl}^{1/2} \Psi_j^* \left( I + p_{MS}\tau \sum_{i=1}^{L} \Psi_i D_{il}^{1/2} \Psi_i^* \right)^{-1} Y_l.$$

Data Transmission from Base Stations to Mobiles.

Using the estimates $\hat{H}_{jl}$, $j=1, \ldots L$, the l-th base station can use either linear or nonlinear precoding to provide mobiles from the l-th cell with strong signals and to limit intra-cell interference and inter-cell interference to mobiles from its own cell and to mobiles from other cells. In particular, a linear precoding can be done as follows.

Let $q_{l1}, \ldots, q_{lK}$ be signals that should be transmitted by the l-th base station to the corresponding mobiles from the l-th cell. Using the estimates $\hat{H}_{jl}$, $j=1, \ldots, L$, the l-th base station forms an M×K precoding matrix $A_l$ and transmits signals $$s_l = \begin{pmatrix} s_{l1} \\ \vdots \\ s_{lK} \end{pmatrix} = A_l \begin{pmatrix} q_{l1} \\ \vdots \\ q_{lK} \end{pmatrix}. \quad (2)$$

The signal received by the k-th mobile from the j-th cell is $$x_{jk} = \sum_{l=1}^{L} \sqrt{p_{BS}\beta_{jlk}}\, h_{jlk} s_l + z, \quad (3)$$

where z represents additive noise.

There are many different efficient precoding matrices, that allow one to significantly reduce the intra-cell interference and the inter-cell interference. One possible way is to use as $A_l$ the pseudoinverse of $\hat{H}_{ll}$.

Pilot Signals and their Assignment to Mobiles

As mentioned above, precoding may be employed to significantly reduce the interference. However, as a general rule, the precoding works well only if the estimates $\hat{h}_{jlk}$, $j=1, \ldots L$, $k=1, \ldots, K$, are accurate and uncorrected. In order to obtain fully accurate and uncorrected estimates, the pilot signals (also referred to below as "pilots") $\psi_{jk}$, $j=1, \ldots L$, $k=1, \ldots K$, must be orthogonal. Unfortunately it is not generally possible, as a practical matter, to satisfy this requirement simultaneously over all mobiles in a given cell and its neighboring cells.

That is, mobiles may move with high speeds, e.g. vehicular speeds, and may consequently have short coherence intervals, i.e., low values of T. The channel coefficients, which the base station learns with the help of the pilots, remain effectively constant only during a given coherence interval. As a consequence, the maximum interval available to the base station for transmitting data to the mobiles is T–τ. Therefore, it is advantageous to make τ, the length of the pilot signals measured in symbol intervals, as small as possible.

Typically, τ can take values from 4 to 12, depending on the speed of the mobiles in a particular wireless network. Elementary vector analysis teaches that a set of mutually orthogonal τ dimensional vectors cannot contain more than τ elements; otherwise, at least one pair of vectors will be non-orthogonal. Consequently, the maximum number of mobiles that can have orthogonal pilot signals at a given time is equal to τ.

The number L of cells in a group consisting of a given cell and the cells neighboring the given cell in a typical hexagonal network is 7 as shown, e.g., in FIG. 1, and it will be taken as 7 in our illustrative example. For example, as will be seen in FIG. 1, a cell 1 may be surrounded by neighbor cells 2-7. Thus it will be clear that if two or more mobiles are simultaneously served by their respective base stations in a given cell and each of its six neighbors, the pilots being used cannot all be mutually orthogonal, even if τ is as high as 12.

Mitigation of intra-cell interference is generally considered to be more important than mitigation of inter-cell interference. Intra-cell interference can be efficiently mitigated by requiring that all the pilots used within a given cell be orthogonal. Accordingly, it will be assumed in the example discussed below that pilot signals used for the mobiles within a given cell are orthogonal.

Without loss of generality, consider two different cells Cell 1 and Cell 2, a pilot signal $\psi_{1k}$ belonging to the k'th mobile of Cell 1, and a pilot signal $\psi_{2q}$ belonging to the q'th mobile of Cell 2. If these two pilot signals are not orthogonal, then the estimates of the channel vectors $h_{12k}$ and $h_{22q}$ will be inaccurate, and in particular, they will be at least partially correlated. This will result in a bad precoding matrix $A_2$. That is, using such estimates, the base station of index l=2 will generate a precoding matrix $A_2$ whose entries are at least partially adapted to aid the transmission of data from the l=2 base station to the k-th mobile of Cell 1. In other words, the signal $s_2$ generated according to Eqn. (2) will arrive at the k-th mobile of Cell 1 with relatively high strength. Stated differently, the product $|h_{jlk}s_l|$, where j=1 and l=2, will be large. Thus the l=2 base station will unavoidably beamform the downlink signal for the q'th mobile of Cell 2 so as to create a directed interference at the k'th mobile of Cell 1. Referring again to FIG. 1, it will be seen that the signals shown arriving at two mobile stations of Cell 2 cause interference of the kind described here.

Figure 2:
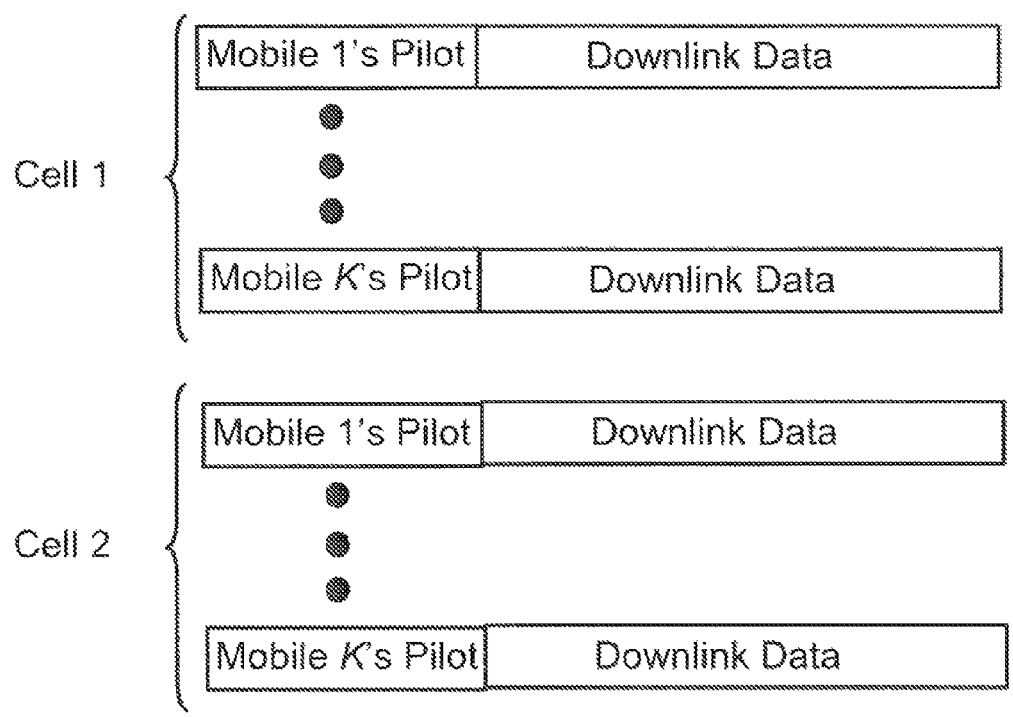
FIG. 2 is a timing diagram illustrating the synchronous transmission of pilot signals from mobile stations in a group of neighboring cells.

To obtain the precoding matrix, one conventional approach has all the mobile stations in a group of neighboring cells synchronously send pilot signals to their respective base stations, as illustrated in FIG. 2. By "synchronously" is meant that all pilot transmissions in the synchronous group of mobile stations begin together and end together.

It should be noted, however, that to preserve intra-cell orthogonality, at most τ mobiles of a given cell can synchronously transmit pilot signals, τ being, as noted, the number of symbol intervals in a pilot signal. Thus, although FIG. 2 (as well as FIG. 3) shows synchronous transmissions from K mobile stations, it should be understood that if K≥τ, then to preserve intra-cell orthogonality, fewer than all mobile stations in the cell will be active at one time.

The base stations use these pilots to estimate the channel coefficients to each of their corresponding mobile stations, and they use the estimated channel coefficients to compute the precoding matrices. However, each channel estimate based on the pilot from a given mobile station may be contaminated by one or more synchronously transmitted non-orthogonal pilots from different mobile stations (which will typically be transmitting from other, neighboring cells). As noted above, such contamination may lead to downlink interference that is significantly stronger than the interference from a random signal of the same power. This can result in significant reduction of downlink transmission rate in Multi-Cell Multi-User wireless systems.

Figure 3:
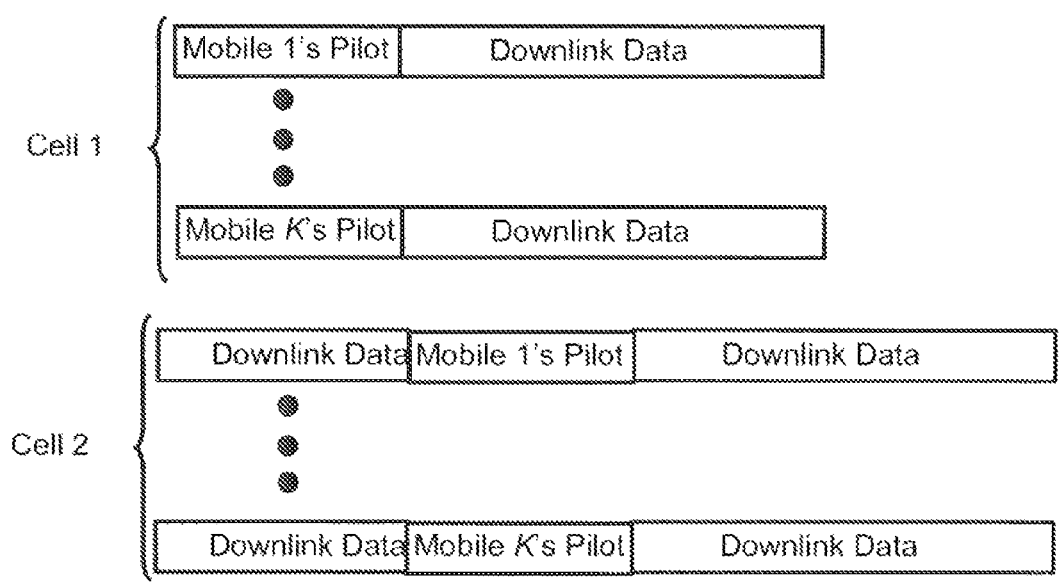
FIG. 3 is a timing diagram illustrating an alternative to the format of FIG. 2, in which there is a timing offset between the pilot transmissions in different cells.

An alternative protocol is illustrated in FIG. 3. In this protocol K mobiles from a given cell use K orthogonal pilots and send them synchronously. At the same time, mobiles from different cells send shifted-in-time pilots, as shown in the figure. In this case, pilots from different cells will not contaminate each other.

New Approach

However, such an approach suffers from the problem that signals transmitted by base stations are significantly stronger than signals transmitted by mobiles. Thus, the base station BS 1 will have to estimate the channel coefficients of the mobiles from cell 1 in the presence of strong downlink signals transmitted by BS 2 and the base stations of other neighboring cells.

We will now describe a new approach we have developed to address this problem.

We note first that because there is a timing offset of the pilot transmissions from neighboring (and thus, potentially interfering) cells, we can limit the discussion, below, to the mobiles of only a given cell. Accordingly, the notational symbol $h_{jlkm}$ that we have used, above, to represent the channel coefficient from mobile k of cell j to base station antenna m of cell l will now be simplified to the form $h_{km}$, representing the channel coefficient from mobile k to base station antenna m.

Exemplary implementations of our new approach are achieved through the following steps:
1. Equip base stations with an additional set of V auxiliary antennas, which are passive antennas in the sense that they are used for reception but not for transmission.
2. Employ a communication protocol and a signal processing algorithm that allow the base station to estimate the channel coefficients $h_{km}$ between the M active antennas and the mobiles even in the presence of strong downlink signals from other base stations. The protocol and signal processing algorithm, which are discussed below, are based on the use of M active antennas, which we refer to as "main" antennas, and the N passive antennas, which we refer to as "auxiliary" antennas.

3. Optionally, optimize the respective numbers of active and passive antennas.

Mathematical Details

Figure 4:
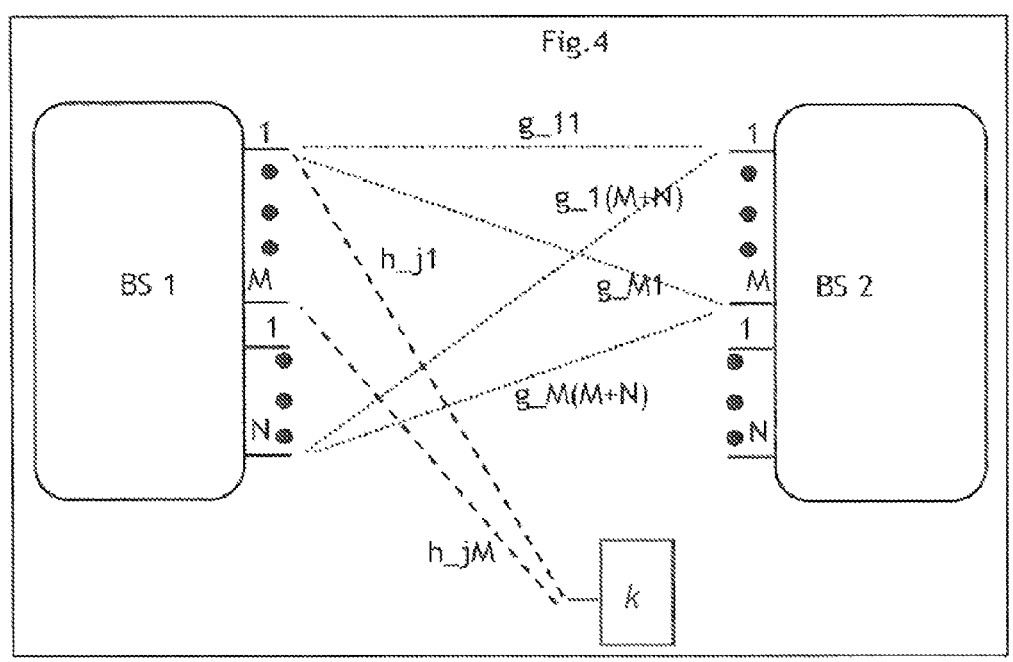
FIG. 4 is a schematic diagram of a portion of a network in which two base stations are equipped with main and auxiliary antennas according to an embodiment of the invention.

A generic situation is shown for purposes of illustration in FIG. 4. In the figure, base station BS 1 serves cell 1, and base station BS 2 serves cell 2. In cell 1 there are K mobile stations. (Only one mobile, i.e., mobile k, is shown in the figure.) A set of τ of these mobiles simultaneously transmit τ orthogonal pilots. Mobiles from different cells send shifted-in-time pilots, as shown in FIG. 3.

The k'th mobile of cell 1 transmits pilot $$\psi_k \begin{pmatrix} \psi_{k1} \\ \vdots \\ \psi_{k\tau} \end{pmatrix}$$

At the t'th instant of time, let BS 2 transmit signals $s^T = (s_1, \ldots, s_M)$ from its M active antennas to mobiles located in cell 2. (Here, the superscript "T" indicates matrix transposition.) The signal $s^T = (s_1, \ldots s_M)$ is not known to'BS 1.

The channel coefficients between the k'th mobiles and M active antennas of BS 1 are $h_{k1}, \ldots h_{kM}$.

We denote by $h_k = (h_{k1}, \ldots h_{kM})$ the 1×M vector formed by the channel coefficients of the k'th mobile.

The channel coefficients between the M active antennas of BS 2 and the M+N antennas of BS 1 are $g_{jr}$, j=1, . . . , M+N, r=1, . . . M. Let $$G = [g_{jr}]$$

be the (M+N)×M matrix formed by the channel coefficients $g_{jr}$ between BS 1 and BS 2.

At the t'th time instant, BS 1 receives 1×(M+N) vector $$y_t = (Gs)^T + \psi_1 h_1 + \ldots + \psi_K h_K + \text{additive noise.}$$

As noted above, intra-cell orthogonality is preserved only if K≤τ. Accordingly, for cells that contain more than τ mobile stations, K should be understood for purposes of this discussion as the number of mobile stations in a subset that contains no more than τ mobile stations.

The channel matrix G does not change or changes very slowly, since the base stations do not move. Hence, by sending appropriate pilots, G can be accurately estimated and periodically updated.

Let all base stations transmit signals with power $p_{BS}$. Assume that all mobiles transmit with power $p_{MS}$. (The algorithm is readily extended to apply to the case in which different mobiles and base stations transmit with different powers.) To simplify our notation, we assume that all base stations have the same power and that all mobiles have the same power. Extensions to more general cases are straightforward.

The standard assumption in wireless systems is that $h_k \sim CN(0, I_{(M+N)})$, where $I_{(M+N)}$ is the (M+N)×(M+N) identity matrix. That is, it is assumed that the channel vectors have the complex Gaussian distribution with the covariance matrix $I_{(M+N)}$. If the channel vectors have a different distribution, the algorithm described here is readily modified accordingly.

BS 1 can now perform the following procedure:

1. Using a good estimate of G allows BS 1 to accurately estimate the vector s transmitted by BS 2. This is done, e.g., using estimation techniques known from linear regression analysis, in which the terms $\psi_1 h_1 + \ldots \psi_K h_K$ are treated as additional noise. In particular, BS 1 can use the Bayesian MMSE estimator to obtain the M×1 vector $$s_{est} = [1/(K+1)][(1/p_{BS}I_M) + (1/(K+1))G^*G)]^{-1}G^*y_t^T$$

Here * denotes the Hermitian conjugate, $I_M$ denotes the M×M identity matrix, and $s_{est}$ is the estimated version of the vector s transmitted by BS 2.

2. BS 1 subtracts the vector $(G s_{est})^T$ from $y_t$, so as to obtain the (M+N×1) vector $$w_t = y_t - (Gs_{est})^T = \psi_{1t}h_1 + \ldots + \psi_{Kt}h_K + (G(s - s_{est}))^T + \text{additive noise}$$

3. Accumulating vectors $w_t$ for t=1, . . . , τ (τ is the length of the pilots $\psi_k$), BS 1 can estimate the channel coefficients $h_{km}$. This can be done in the following way. Let $z_t$ be the M×1 vector formed by the first M entries of $w_t$. Let Z be the τ×M matrix formed by $z_1, \ldots z_\tau$, that is, $$Z = \begin{pmatrix} Z_1 \\ \vdots \\ Z_\tau \end{pmatrix}.$$

Assuming that the term $G(s - s_{est})$ is small and using the standard MMSE estimation method we obtain, for mobile station i:

$$h_{i,est} = c\psi_i^* Z_i, \text{ where } c = \text{sqrt}(p_{MS}\tau)(1 + p_{MS}\tau).$$

4. Using the obtained estimates $h_{i,est}$ of $h_i$, BS 1 can conduct an interference cancellation precoding (for instance zero-forcing precoding) without creating a directed interference to cell 2.

As explained above at steps 1 and 2, base station BS 1 estimates the vector s and subtracts the vector $(G s_{est})^T$ from $y_t$, so that the channel coefficients $h_{km}$ can be estimated without degradation by the signal s. This is an example of nulling, by which we mean any method which reduces or removes the degrading effect of s on the channel-coefficient estimates.

Note that the performance of the algorithm can be further improved if steps 1-3 are iterated several times. This can be done, e.g., if the base stations are equipped with fast computational devices and can conduct steps 1-3 several times within a suitable timeframe. Appropriate computational devices include special purpose digital processors, but they are not so limited and may alternatively include other special-purpose or general-purpose computational devices operating under hardware, firmware, or software control.

In the case when several base stations from the neighboring cells transmit signals the above-described approach can likewise be used.

It is not difficult to see that the larger the number of passive antennas N, the better the estimates of the channel coefficients that BS 1 can obtain. Indeed let us assume that N tends to infinity. Then using the N passive antennas BS can obtain an arbitrarily accurate estimate of the vector s transmitted by BS 2. (This directly follows from linear regression analysis.) In such case we have $s_{est} = s$ and therefore $$w_t = y_t - (Gs_{est})^T = \psi_1 h_1 + \ldots + \psi_K h_K + \text{additive noise,}$$

which corresponds to the case when K mobiles from cell 1 transmit orthogonal pilots and no other base stations or mobiles from cell 2 transmit any signals at all. This is a very favorable situation for BS 1. In this case, BS 1 can accurately estimate the channel vectors $h_1, \ldots h_K$ and transmit to mobiles from cell 1 without creating any directed interference to mobiles located in cell 2.

Of course there will always be practical limits on the total number of antennas L (including both active and passive antennas) that can be deployed. It is therefore advantageous to choose an optimal number of active M and passive N antennas.

One optimization method that is useful in this regard involves estimating the sum rate (i.e. the system throughput) for various combinations of M and N by computer simulation. Methods for estimating the sum rate are known and need not be described here in detail. One exemplary such method is described in T. L. Marzetta, "How much training is required for multiuser MIMO," *Proc. of Signal, Systems, and Computers*, ACSS 2006, Fortieth Asilomar Conference, pp. 359-363 (November 2006).

According to our exemplary optimization method, computer simulation is used to estimate the sum rate for different values M and N that satisfy the constraint M+N=L. A search of the results can identify the numbers $M_{opt}$ and $N_{opt}$ (such that $M_{opt}+N_{opt}=L$) of active and passive antennas that maximize the sum rate.

It should be noted that passive antennas do not require signals amplifiers and therefore they are less expensive than active antennas. Thus, if the total number of antennas is L and we deploy an optimal number of passive antennas N (M=L-N) then we simultaneously increase the data transmission rate and decrease the cost of the system.

In some embodiments, the number of antennas to be designated as main antennas, and the number to be designated as auxiliary antennas may be variable, and thus may be adapted to changing conditions. Whether a given antenna is to be designated as "main" or "auxiliary" may also be selectable. For example, switches may be used to connect selected antennas to transmit chains while connecting other selected antennas to receive chains only, and to designate how the output from a given antenna (operating in receive mode) is to be processed, i.e., whether for full communication or only for interference mitigation.

It can also be made a matter of choice to use only auxiliary antennas, or a combination of main and auxiliary antennas, for estimating the interfering signals from the neighboring base stations.

Example

Figure 5:
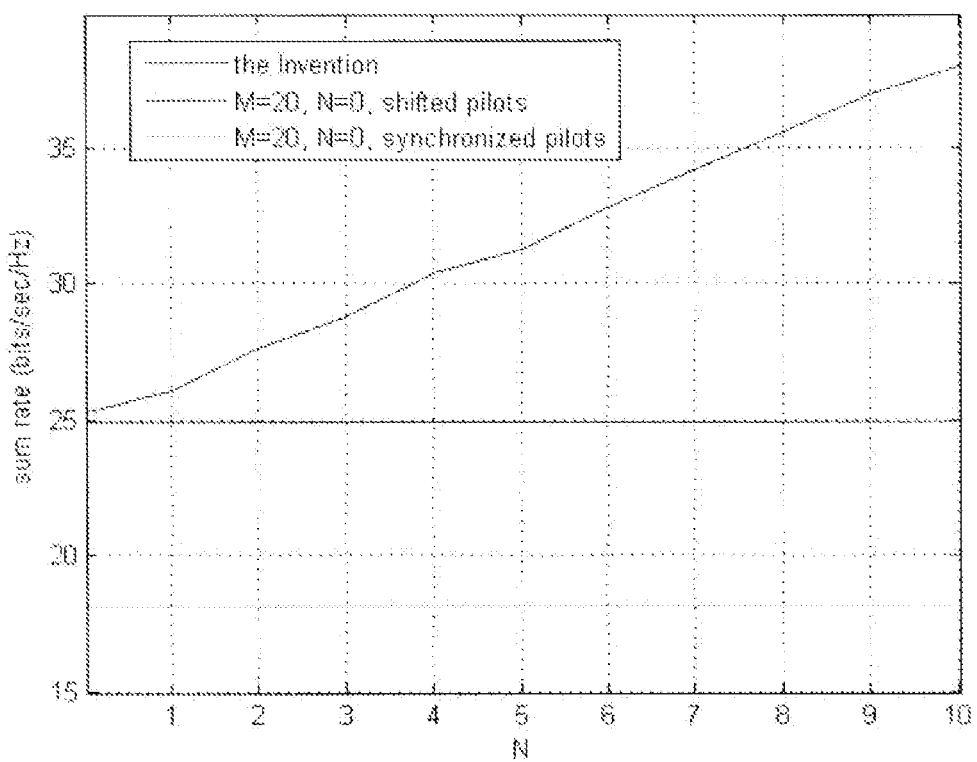
FIG. 5 is a graph of simulation results showing throughput in a model network versus the number of auxiliary antennas.

FIG. 5 presents the results of a numerical simulation that we performed for the case of seven neighboring cells, as illustrated, e.g., in FIG. 1. We assume that in each cell there are four mobiles and that the mobiles use the same set of orthogonal pilots, each pilot consisting of n=4 symbols. More precisely we assume that the these four pilots form rows of the Hadamard matrix of size 4.

From top to bottom, the three curves represent, respectively, our new method, with results that are dependent on the number N of passive antennas; the method using time-offset pilot transmissions as described with reference to FIG. 3; and the method using synchronous pilot transmissions without a time offset, as described with reference to FIG. 2.

It is evident that the protocol in which mobiles from different cells send shifted-in-time pilots exhibits gains over the protocol in which all mobiles in all cells send pilots synchronously. (Only M active antennas are used in both cases). One can also see that the proposed scheme with N passive antennas gives further significant improvement.

What is claimed is:

1. A method performed by a base station serving one or more mobile terminals, comprising:
   receiving a plurality of signals at a plurality of base station antennas of the base station, said plurality of base station antennas including at least one main antenna and at least one passive antenna, said plurality of signals including at least one pilot signal from the one or more terminals and at least one interfering signal transmitted by a neighboring base station to mobile terminals served by the neighboring base station;
   estimating the interfering signal;
   determining a difference between the received plurality of signals and a product of channel coefficients between the plurality of base station antennas of the base station and the neighboring base station and the estimated at least one interfering signal;
   determining channel coefficients associated with the one or more mobile terminals that transmitted the at least one pilot signal based on the determined difference; and
   nulling an interference caused by the at least one interfering signal by determining a set of pre-coding weights based on the determined channel coefficients, the set of pre-coding weights being used for transmission from the at least one main antenna to the one or more mobile terminals.

2. The method of claim 1, further comprising:
   transmitting data to one or more of the served mobile terminals using the determined channel coefficients, said transmission taking place from the main antennas while no transmission is made from the passive antennas.

3. The method of claim 2, wherein the data transmission is made simultaneously to a plurality of served mobile terminals.

4. The method of claim 1, wherein the at least one pilot signal is received simultaneously from a plurality of served mobile terminals.

5. The method of claim 1, wherein the receiving is performed at least partly during a transmission from the at least one neighboring base station, and outputs from the at least one passive antenna is used in the determining of the channel coefficients between the one or more mobile terminals that transmitted the at least one pilot signal and the at least one active antenna of the base station.

6. The method of claim 1, wherein the outputs from the at least one main antenna and the at least one passive antenna are used in the determining of the channel coefficients between the one or more mobile terminals that transmitted the at least one pilot signal and the at least one active antenna of the base station.

7. The method of claim 1, further comprising:
   selecting some antennas of said plurality of base station antennas to be main antennas, and
   selecting some other antennas of said plurality of base station antennas to be the passive antennas.

* * * * *